United States Patent
Marupaduga

(10) Patent No.: US 10,616,897 B1
(45) Date of Patent: Apr. 7, 2020

(54) WIRELESS ACCESS POINT TO CONTROL WIRELESS USER DATA EXCHANGES THROUGH WIRELESS RELAYS

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 198 days.

(21) Appl. No.: 15/440,351

(22) Filed: Feb. 23, 2017

(51) Int. Cl.
  H04W 72/06 (2009.01)
  H04W 72/04 (2009.01)
  H04W 76/30 (2018.01)
  H04W 28/02 (2009.01)
  H04B 7/155 (2006.01)
  H04W 88/02 (2009.01)

(52) U.S. Cl.
  CPC ........ H04W 72/06 (2013.01); H04B 7/15528 (2013.01); H04W 28/0289 (2013.01); H04W 72/042 (2013.01); H04W 72/0486 (2013.01); H04W 76/30 (2018.02); H04W 88/02 (2013.01)

(58) Field of Classification Search
  CPC ..... H04W 72/06; H04W 76/30; H04W 76/06; H04W 72/042; H04W 28/0289; H04W 88/02; H04W 72/0486; H04B 7/15528
  See application file for complete search history.

(56) References Cited

U.S. PATENT DOCUMENTS

| | | | |
|---|---|---|---|
| 7,193,966 B2 | 3/2007 | Gupta et al. | |
| 7,440,761 B2 | 10/2008 | Matsukura et al. | |
| 7,848,309 B2 | 12/2010 | Matsukura et al. | |
| 7,894,388 B2 | 2/2011 | Visotsky | |
| 8,078,187 B2 | 12/2011 | Matsukura et al. | |
| 8,391,254 B2 | 3/2013 | Koo et al. | |
| 8,711,754 B2 | 4/2014 | Okuda | |
| 9,185,602 B2 | 11/2015 | Nakagawa et al. | |
| 9,391,805 B2 | 7/2016 | Wang et al. | |
| 2008/0165719 A1 | 7/2008 | Visotsky | |
| 2008/0316954 A1 | 12/2008 | Zheng | |
| 2011/0151774 A1* | 6/2011 | Li | H04B 7/2606 455/9 |
| 2012/0093059 A1* | 4/2012 | Bai | H04L 5/0007 370/312 |
| 2015/0373744 A1* | 12/2015 | Rosa | H04L 1/16 370/329 |
| 2016/0080257 A1 | 3/2016 | Farmanbar et al. | |
| 2017/0142653 A1* | 5/2017 | Qi | H04W 4/70 |
| 2018/0123683 A1* | 5/2018 | Wakabayashi | H04B 7/2606 |

* cited by examiner

Primary Examiner — Moo Jeong

(57) ABSTRACT

A wireless access point wirelessly exchanges user data with a Radio Access Network (RAN). The RAN comprises multiple wireless relays that wirelessly exchange the user data with multiple wireless user devices based on individual relay data thresholds. The wireless access point determines individual amounts of the wireless user devices served by individual wireless relays. The wireless access point ranks the wireless relays based on the amounts of wireless user devices. The wireless access point assigns individual relay data thresholds to the wireless relays based on the ranking. Higher-loaded wireless relays are assigned higher data thresholds than lower-loaded wireless relays. The wireless relays wirelessly exchange additional user data with the wireless user devices based on the assigned relay data thresholds.

18 Claims, 5 Drawing Sheets

E-NODE-B 320

RELAY DATA THRESHOLD DATA STRUCUTRE 421

| WIRELESS RELAY | UE LOAD | DATA THRESHOLD |
|---|---|---|
| 312 | 6 | 6.7 |
| 311 | 5 | 5.5 |
| 313 | 2 | 3.2 |
| 314 | 1 | 2.6 |

RELAY CARRIER AGGREGATION (CA) CONTROL DATA STRUCUTRE 422

| WIRELESS RELAY | RELAY CONGEST | CA SCCs |
|---|---|---|
| 312 | 70% | 6 |
| 311 | 60% | 4 |
| 313 | 40% | 3 |
| 314 | 20% | 2 |

E-NODE-B 320

RELAY DATA THRESHOLD DATA STRUCUTRE 421

| WIRELESS RELAY | UE LOAD | DATA THRESHOLD |
|---|---|---|
| 312 | 6 | 6.7 |
| 311 | 5 | 5.5 |
| 313 | 2 | 3.2 |
| 314 | 1 | 2.6 |

RELAY CARRIER AGGREGATION (CA) CONTROL DATA STRUCUTRE 422

| WIRELESS RELAY | RELAY CONGEST | CA SCCs |
|---|---|---|
| 312 | 70% | 6 |
| 311 | 60% | 4 |
| 313 | 40% | 3 |
| 314 | 20% | 2 |

FIGURE 4

WIRELESS ACCESS POINT TO CONTROL WIRELESS USER DATA EXCHANGES THROUGH WIRELESS RELAYS

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Wireless communication networks are deployed to extend the range and mobility of these data communication services.

The typical wireless communication network has several macro-cell base stations that provide radio coverage over large urban areas. The macro-cell base stations may still not be able to cover every part of the urban area with enough capacity. Outside of the urban areas, the macro-cell base stations may be too large for environments like inter-state highways and smaller towns. Wireless relays are deployed to alleviate these problems.

A wireless relay has a wireless access point to wirelessly communicate with user devices. The wireless relay also has wireless Relay Equipment (RE) to wirelessly communicate with macro-cell base stations or other relays. Thus, the macro-cell base stations serve both user devices and wireless relays, and the wireless relays also serve both user devices and wireless relays.

A Radio Access Network (RAN) made of wireless relays has a finite amount of data throughput and wireless resources. The actual data throughput and wireless resources are largely driven by the attached User Equipment (UEs). The data throughput and wireless resources used by each UE are aggregated to become the data throughput and wireless resources used by the wireless relay. The wireless resources may comprise Carrier Aggregation (CA) links. The CA links comprise a Primary Component Carrier (PCC) for network signaling and user data. The CA links include Secondary Component Carriers (SCCs) for additional user data. In some cases, the relay UE also uses CA for its network access.

Unfortunately, the wireless access points do not effectively and efficiently assign data thresholds and wireless resources to the wireless relays in the RAN.

TECHNICAL OVERVIEW

A wireless access point wirelessly exchanges user data with a Radio Access Network (RAN). The RAN comprises multiple wireless relays that wirelessly exchange the user data with multiple wireless user devices based on individual relay data thresholds. The wireless access point determines individual amounts of the wireless user devices served by individual wireless relays. The wireless access point ranks the wireless relays based on the amounts of wireless user devices. The wireless access point assigns individual relay data thresholds to the wireless relays based on the ranking. Higher-loaded wireless relays are assigned higher data thresholds than lower-loaded wireless relays. The wireless relays wirelessly exchange additional user data with the wireless user devices based on the assigned relay data thresholds.

DESCRIPTION OF THE DRAWINGS

FIGS. 3-4 illustrate a Long Term Evolution (LTE) network with a macro-cell eNodeB that wirelessly exchanges user data with wireless relays.

DETAILED DESCRIPTION

Figure 1:
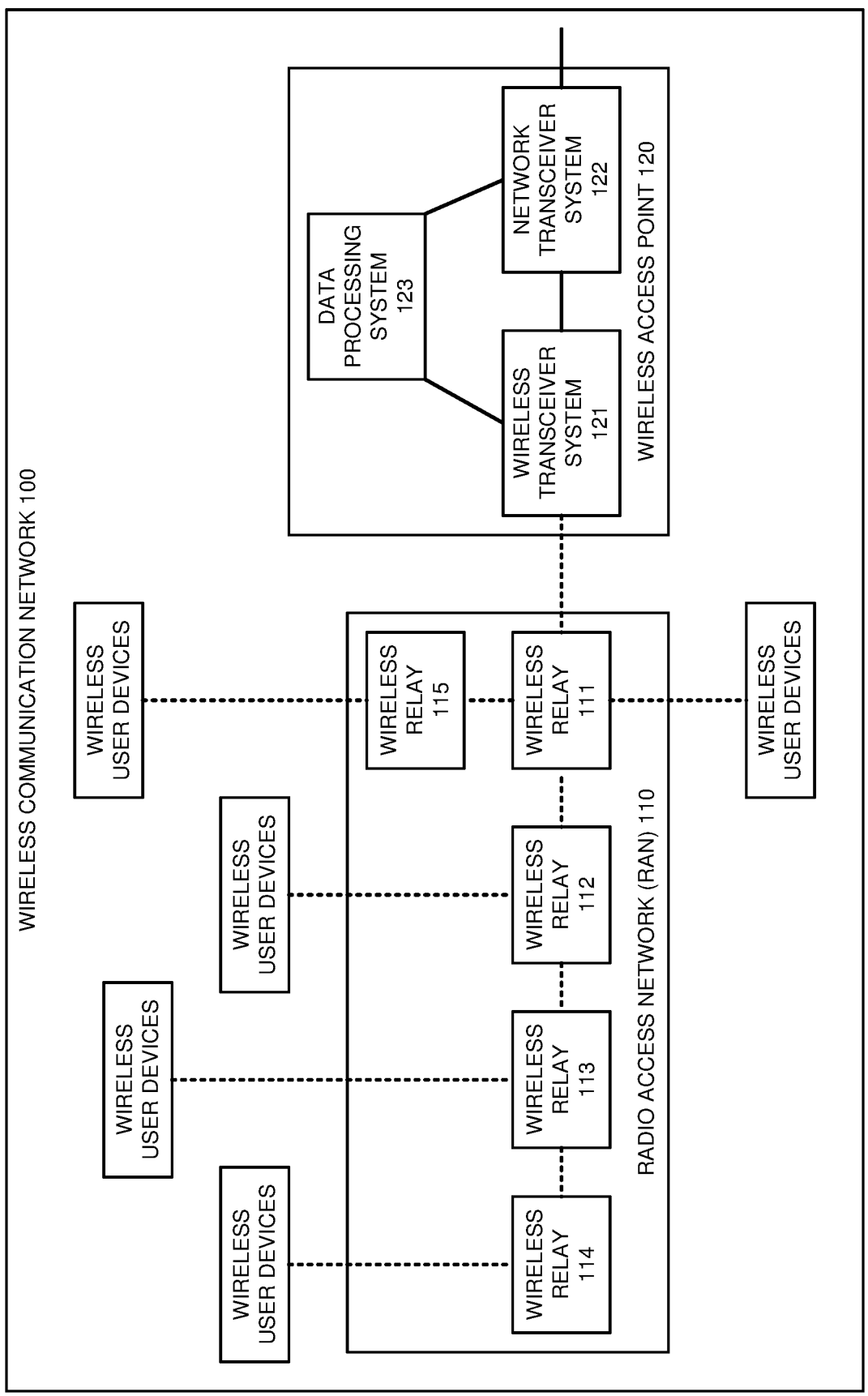
FIGS. 1-2 illustrate a wireless communication network with a wireless access point that wirelessly exchanges user data with a radio access network.
Figure 2:
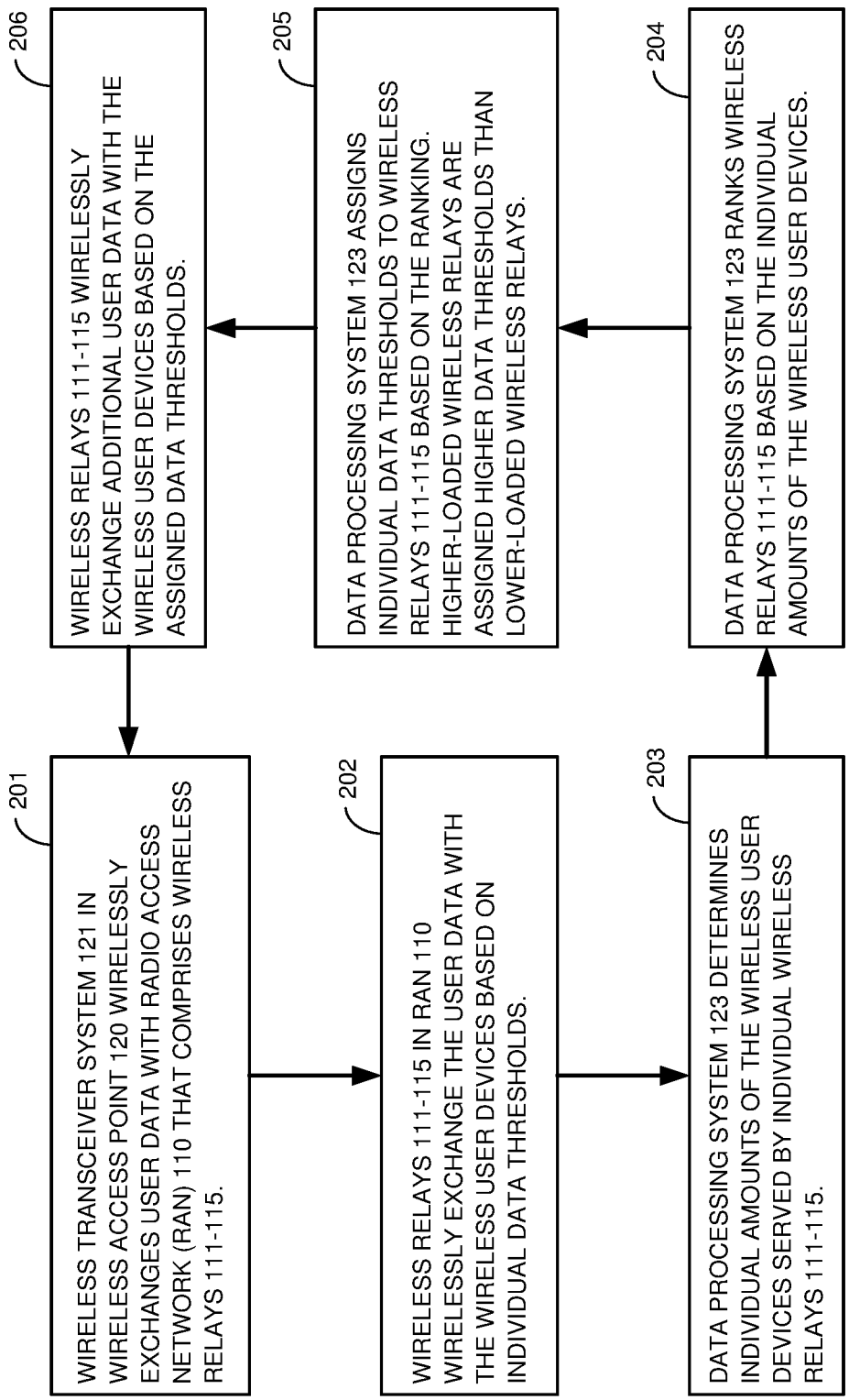

FIGS. 1-2 illustrate wireless communication network 100 with wireless access point 120 that wirelessly exchanges user data with Radio Access Network (RAN) 110. RAN 110 wirelessly exchanges user data with multiple wireless user devices based on individual data thresholds for each relay. The wireless user data exchanges support data services such as content streaming, media conferencing, machine communications, internet access, or some other computerized information service.

Referring to FIG. 1, wireless communication network 100 comprises several wireless user devices. The wireless user devices comprise computers, phones, or some other intelligent machines with RF communication components. Wireless communication network 100 also comprises RAN 110 and wireless access point 120. RAN 110 comprises wireless relays 111-115. Wireless access point 120 includes wireless transceiver system 121, network transceiver system 122, and data processing system 123.

Wireless relays 111-115 each comprise a base station and Relay Equipment (RE). Wireless relays 111-115 are made of computer hardware like Central Processing Units (CPUs), Random Access Memory (RAM), persistent data storage, bus interfaces, and data transceivers. The data transceivers include antennas, amplifiers, filters, and digital signal processors for wireless data communication. Wireless relays 111-115 also have computer software like an operating system, baseband modules, networking modules, and network applications.

Wireless access point 120 could be a base station, evolved Node B, computer, network appliance, or some other intelligent machine with RF communication components. Wireless access point 120 is made of computer hardware like data communication transceivers, bus interfaces, CPUs, RAM, and data storage. Wireless transceiver system 121 includes antennas, amplifiers, filters, and digital signal processors for wireless data communication. Wireless access point 120 has computer software like an operating system, baseband modules, networking modules, and network applications.

In operation, the wireless user devices exchange wireless user data with wireless relays 111-115. Wireless relays 113-114 exchange a portion of the wireless user data with each other. Wireless relays 112-113 exchange a portion of the wireless user data with each other. Wireless relays 112 and 115 exchange a portion of the wireless user data with wireless relay 111. Wireless relay 111 and wireless transceiver system 121 exchange the wireless user data with each other. Wireless transceiver system 121 and network transceiver system 122 exchange the user data, and network transceiver system 122 exchanges the user data with other systems.

Data processing system 123 determines individual amounts of wireless user devices that are served by individual wireless relays 111-115. For example, wireless relay 114 may currently serve five wireless user devices. In some examples, the device amounts comprise Long Term Evolution (LTE) Radio Resource Control (RRC) connections. The device amounts may also include the downstream wireless user devices that are served by downstream wireless relays. For example, the five wireless user devices served by wireless relay 114 would be included in the device amount for wireless relay 113 because wireless relay 113 serves wireless relay 114.

Data processing system 123 ranks wireless relays 111-115 based on their individual amounts of wireless user devices. Data processing system 123 then assigns individual data thresholds to wireless relays 111-115 based on their ranking. The highly-loaded wireless relays are assigned to higher data thresholds, and the lightly-loaded wireless relays are assigned to lower data thresholds. In RAN 110, the data thresholds may be fixed and pre-configured for each load ranking. Wireless relays 111-115 then exchange additional wireless user data with the wireless user devices based on these newly assigned data thresholds.

Data processing system 123 also determines individual amounts of wireless communication resources allocated to individual wireless relays 111-115. The wireless communication resources may comprise Orthogonal Frequency Division Multiplex (OFDM) resource blocks, wireless bandwidth, Carrier Aggregation (CA) component carriers, or some other networking allocation. For example, wireless relay 113 may get four secondary component carriers from wireless relay 112, but wireless relay 114 may only get two secondary component carriers from wireless relay 113.

Wireless access point 120 may also determine individual amounts of wireless communication congestion experienced by individual wireless relays 111-115. Relay congestion might be measured by radio resource usage, relay buffer status, relay CPU occupancy, and the like. Wireless access point 120 ranks wireless relays 111-115 based their individual amounts of wireless congestion. Wireless access point 120 assigns individual amounts of the wireless communication resources to wireless relays 111-115 based on their congestion ranking. Highly-congested wireless relays are assigned more communication resources than lower-congested wireless relays. In RAN 110, a wireless resource amount may be fixed and pre-configured for each congestion ranking. Wireless relays 111-115 wirelessly exchange additional user data with the wireless user devices based on their newly assigned wireless communication resources.

Referring to FIG. 2, wireless transceiver system 121 and RAN 110 exchange wireless user data (201). In RAN 110, wireless relay 111 and wireless relays 112 and 115 exchange wireless user data (202). Wireless relay 112 and wireless relay 113 exchange wireless user data (202). Wireless relay 113 and wireless relay 114 exchange wireless user data (202). Wireless relays 111-115 and wireless user devices exchange the wireless user data (202). Wireless relays 111-115 use individual relay data thresholds to limit their data throughput.

Data processing system 123 in wireless access point 120 determines individual amounts of wireless user devices served by individual wireless relays 111-115 (203). In some examples, the amounts comprise numbers of LTE RRC connections. The amounts typically include downstream wireless user devices that are served by downstream wireless relays.

Data processing system 123 ranks wireless relays 111-115 based on their individual amounts of wireless user devices (204). Data processing system 123 assigns individual data thresholds to wireless relays 111-115 based on their ranking (205). A date structure could be used to map device-load rankings to data thresholds. The highly-loaded wireless relays are assigned to higher data thresholds, and the lightly-loaded wireless relays are assigned to lower data thresholds. Wireless relays 111-115 wirelessly exchange additional user data with the wireless user devices based on these newly assigned data thresholds (206).

Figure 3:
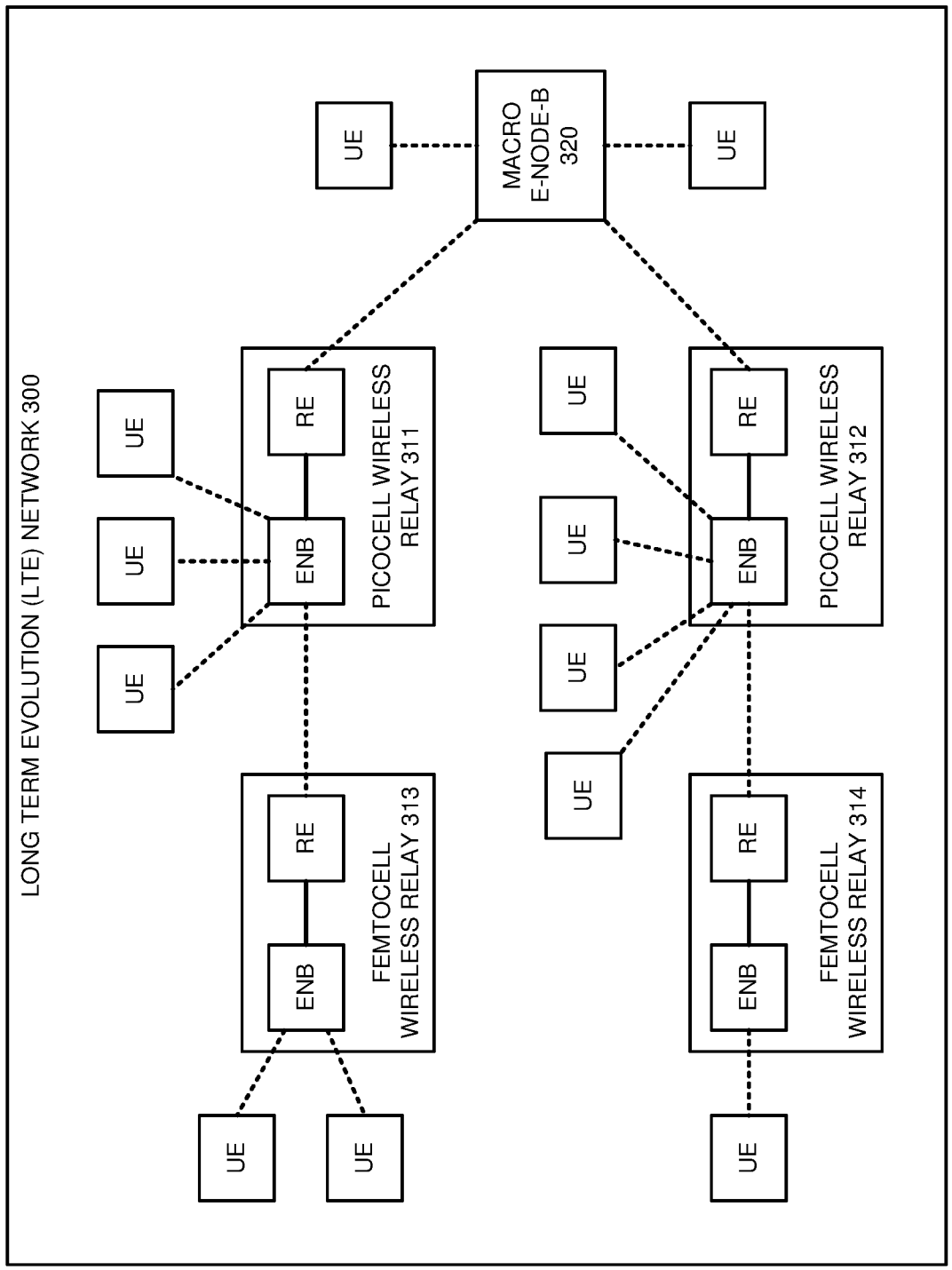

FIGS. 3-4 illustrate Long Term Evolution (LTE) network 300 with a macro-cell eNodeB 320 that wirelessly exchanges user data with wireless relays 311-312. Wireless relays 311-312 comprise pico-cell relays, and wireless relays 313-314 comprise femto-cell relays. The macro, pico, and femto designations represent relative size and capacity. User Equipment (UEs) wirelessly exchange user data with wireless relays 311-314 and macro-cell eNodeB 320. Femto-cell wireless relays 311-312 wirelessly exchange their user data with pico-cell wireless relays 313-314. Pico-cell wireless relays 311-312 wirelessly exchange the user data with macro-cell eNodeB 320. Macro-cell eNodeB 320 exchanges the user data with other systems.

Macro-cell eNodeB 320 determines the UE load on each wireless relay. For example, femto-cell relay 313 has a two UE load, and pico-cell relay 311 has a five UE load (including the two UEs served by relay 313). Macro-cell eNodeB 320 assigns data thresholds to wireless relays 311-314 based on their UE load rank. Wireless relays 311-314 exchange additional wireless user data with the wireless user devices based on these newly assigned data thresholds. For example, the RE may enforce a data threshold limit in wireless relay 313. Likewise, the ENB in relay 311 will also enforce the data threshold for wireless relay 313.

Macro-cell eNodeB 320 also determines amounts of wireless communication resources allocated to individual wireless relays 311-314. The wireless communication resources comprise Carrier Aggregation (CA) Secondary Component Carriers. For example, wireless relay 312 may get four CA SCCs from macro-cell eNodeB 320, but wireless relay 314 may only get two CA SCCs from wireless relay 312.

Macro-cell eNodeB 320 also determines individual amounts of congestion experienced by wireless relays 311-314. Relay congestion is measured by relay buffer status. Macro-cell eNodeB 320 ranks wireless relays 311-314 based their congestion. Macro-cell eNodeB 320 then assigns CA SCCs to wireless relays 311-314 based on their congestion ranking. Wireless relays 311-314 wirelessly exchange additional user data with the UEs based on their newly assigned wireless communication resources.

FIG. 4 illustrates eNodeB 320 to wirelessly exchange user data with wireless relays. eNodeB 320 includes data structures 421-422. Relay data threshold data structure 421 has three columns: wireless relay ID, UE load, and data threshold. The rows are in descending rank and the rows correlate data by rank. For example, wireless relay 313 is ranked $3^{rd}$ and has a UE load of two and a data threshold of 3.2 MB/s. Relay Carrier Aggregation (CA) control data structure 422 has three columns: wireless relay ID, relay congestion, and CA SCCs. The rows are in descending rank and the rows correlate the data by rank. For example, wireless relay 311 is ranked $2^{nd}$ and has a relay congestion of 60% and four CA SCCs.

The third column of data structures 421-422 is typically fixed as the data in the first two columns is loaded by rank. Macro-cell eNodeB 320 uses data structures 421-422 to determine data thresholds and resources for individual wireless relays.

Figure 5:
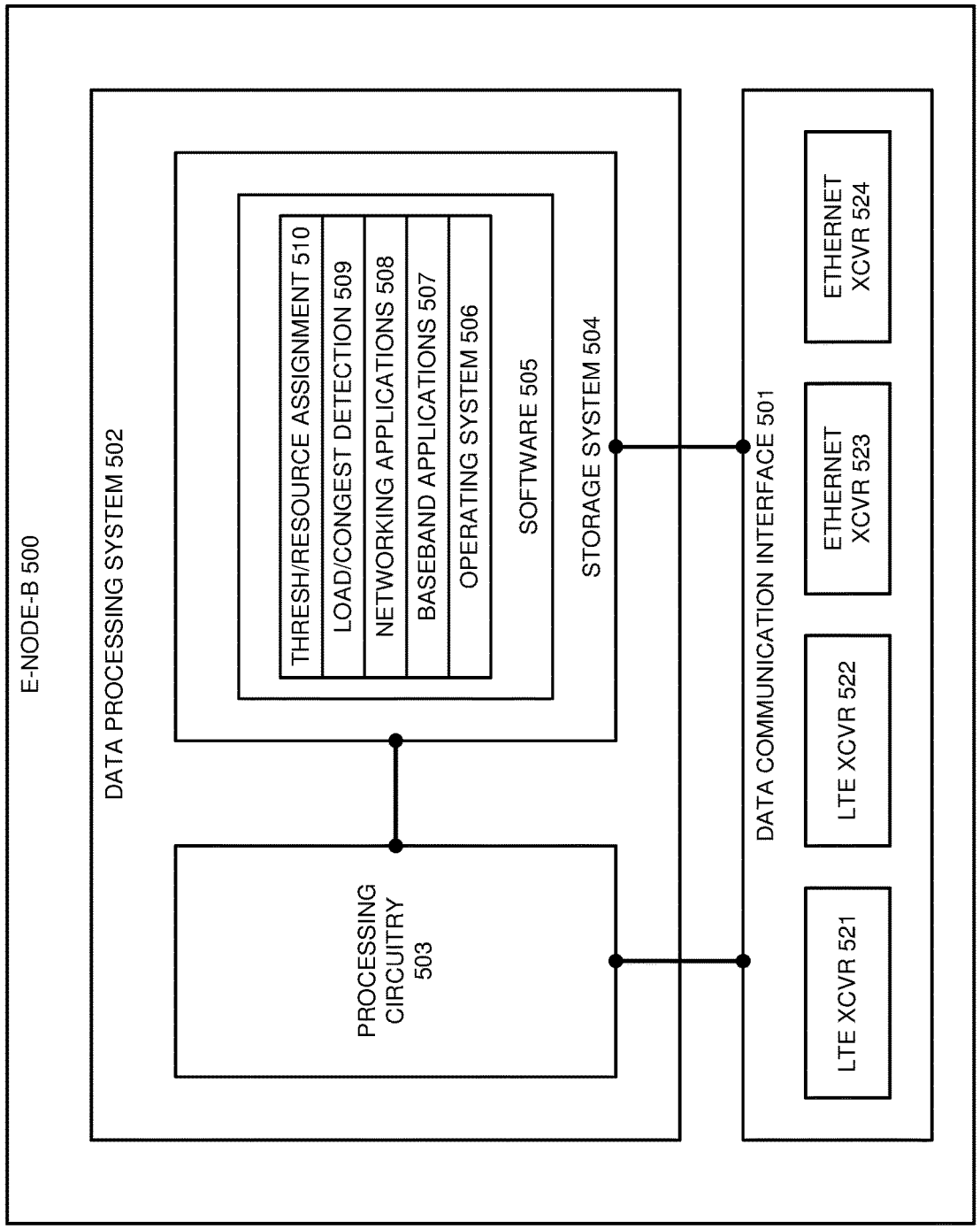
FIG. 5 illustrates an eNodeB 500 to wirelessly exchange user data with wireless relays.

FIG. 5 illustrates eNodeB 500 to wirelessly exchange user data with wireless relays. eNodeB 500 is an example of wireless access point 120 and eNodeB 320, although these base stations may use alternative configurations and operations. eNodeB 500 comprises data communication interface 501 and data processing system 502. Data communication interface 501 comprises Long Term Evolution (LTE) transceivers 521-522 and Ethernet transceivers 523-524. Data processing system 502 comprises processing circuitry 503 and storage system 504. Storage system 504 stores software 505. Software 505 includes respective software modules 506-510.

LTE transceivers 521-522 comprise communication components, such as antennas, amplifiers, filters, modulators, signal processors, ports, bus interfaces, memory, software, and the like. Ethernet transceivers 523-524 comprise communication components, such as ports, bus interfaces, signal processors, memory, software, and the like. Processing circuitry 503 comprises server blades, circuit boards, bus interfaces, CPUs, integrated circuitry, and associated electronics. Storage system 504 comprises non-transitory, machine-readable, data storage media, such as flash drives, disc drives, memory circuitry, servers, and the like. Software 505 comprises machine-readable instructions that control the operation of processing circuitry 503 when executed.

Wireless relay eNodeB 500 may be centralized or distributed. All or portions of software 506-510 may be externally stored on one or more storage media, such as circuitry, discs, and the like. Some conventional aspects of wireless relay eNodeB 500 are omitted for clarity, such as power supplies, enclosures, and the like. When executed by processing circuitry 503, software modules 506-510 direct circuitry 503 to perform the following operations.

Operating system 506 interfaces between software modules 507-510 and the eNodeB hardware (processing circuitry 503, data communication interface 501, RAM, storage). Baseband applications 507 control user access RF protocols for user devices. Networking applications 508 control network RF protocols for network access. Load/Congestion detector 509 ranks wireless relays by UE load and relay congestion. Threshold/Resource assignment 510 assigns data thresholds and wireless resources to wireless relays based on the respective UE load and relay congestion rankings.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point that wirelessly exchanges user data with a Radio Access Network (RAN) that comprises multiple wireless relays that wirelessly exchange the user data with multiple wireless user devices based on individual relay data thresholds, the method comprising:

the wireless access point determining individual amounts of the wireless user devices served by individual ones of the wireless relays and individual amounts of buffer congestion experienced by the individual ones of the wireless relays;

the wireless access point ranking the wireless relays based on the individual amounts of the wireless user devices and ranking the wireless relays based on the individual amounts of buffer congestion;

the wireless access point assigning the individual relay data thresholds to the wireless relays based on the ranking using the individual amounts of wireless user devices wherein higher-loaded ones of the wireless relays are assigned higher ones of the data thresholds than lower-loaded ones of the wireless relays, wherein the wireless relays wirelessly exchange additional user data with the wireless user devices based on the assigned relay data thresholds; and the wireless access point assigning individual amounts of Secondary Component Carrier (SCC) resources to the wireless relays based on the ranking using the individual amounts of buffer congestion wherein higher-congested ones of the wireless relays are assigned higher ones of the SCC resources than lower-congested ones of the wireless relays, wherein the wireless relays wirelessly exchange additional user data with the wireless user devices based on the assigned SCC resources.

2. The method of claim 1 wherein the individual amounts of the wireless user devices served by individual ones of the wireless relays includes downstream ones of the wireless user devices served by downstream ones of the wireless relays.

3. The method of claim 1 wherein the individual amounts of the wireless user devices served by the individual ones of the wireless relays comprises Radio Resource Control (RRC) connections.

4. The method of claim 1 wherein the SCC resources comprise a number of SCC resource blocks.

5. The method of claim 1 wherein the SCC resources comprise an SCC-allocated wireless bandwidth.

6. The method of claim 1 wherein the SCC wireless resources comprise a number of Carrier Aggregation (CA) SCCs.

7. The method of claim 1 wherein the wireless access point comprises a macrocell eNodeB.

8. The method of claim 1 wherein the wireless relays each comprise an eNodeB and Relay Equipment (RE).

9. The method of claim 1 wherein the wireless relays comprise picocell relays and femtocell relays.

10. A wireless access point comprising:

a wireless transceiver system configured to wirelessly exchange user data with a Radio Access Network (RAN) that comprises multiple wireless relays that wirelessly exchange the user data with multiple user communication devices based on individual relay data thresholds; and a data processing system configured to determine individual amounts of the wireless user devices served by individual ones of the wireless relays and individual amounts of buffer congestion experienced by the individual ones of the wireless relays, rank the wireless relays based on the individual amounts of the wireless user devices and ranking the wireless relays based on the individual amounts of buffer congestion, assign the relay individual data thresholds to the wireless relays based on the ranking using the individual amounts of wireless user devices wherein higher-loaded ones of the wireless relays are assigned higher ones of the relay data thresholds than lower-loaded ones of the wireless relays, and wherein the wireless relays wirelessly exchange additional user data with the wireless user devices based on the assigned relay data thresholds; and assign individual amounts of Secondary Component Carrier (SCC) resources to the wireless relays based on the ranking using the individual amounts of buffer congestion wherein higher-congested ones of the wireless relays are assigned higher ones of the SCC resources than lower-congested ones of the wireless relays, and wherein the wireless relays wirelessly exchange additional user data with the wireless user devices based on the assigned SCC resources.

11. The wireless access point of claim 10 wherein the individual amounts of the wireless user devices served by individual ones of the wireless relays include downstream ones of the wireless user devices served by downstream ones of the wireless relays.

12. The wireless access point of claim 10 wherein the individual amounts of the wireless user devices served by the individual ones of the wireless relays comprises Radio Resource Control (RRC) connections.

13. The wireless access point of claim 10 wherein the SCC resources comprise a number of SCC resource blocks.

14. The wireless access point of claim 10 wherein the SCC resources comprise an SCC allocated wireless bandwidth.

15. The wireless access point of claim 10 wherein the SCC resources comprise a number of Carrier Aggregation (CA) SCCs component.

16. The wireless access point of claim 10 wherein the wireless access point comprises a macrocell eNodeB.

17. The wireless access point of claim 10 wherein the wireless relays each comprise an eNodeB and Relay Equipment (RE).

18. The wireless access point of claim 10 wherein the wireless relays comprise picocell relays and femtocell relays.

\* \* \* \* \*